United States Patent
Arimilli et al.

(12)

(10) Patent No.: US 6,463,497 B1
(45) Date of Patent: Oct. 8, 2002

(54) COMMUNICATION METHOD FOR INTEGRATED CIRCUIT CHIPS ON A MULTI-CHIP MODULE

(75) Inventors: Ravi Kumar Arimilli, Austin; Leo James Clark, Georgetown; Bradley McCredie, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,697

(22) Filed: Jul. 30, 1999

(51) Int. Cl.[7] ............................................... G06F 13/14
(52) U.S. Cl. ......................... 710/305; 710/52; 710/42; 710/100
(58) Field of Search .............................. 710/52, 42, 56, 710/60, 61, 64, 100, 305

(56) References Cited

U.S. PATENT DOCUMENTS 5,535,408 A * 7/1996 Hillis ........................... 710/52

OTHER PUBLICATIONS

*Microprocessor Report*: n13, v9, Oct. 2, 1995 p 16(3, ISSN0899–9341, What's Next For Microprocessor Design? Some Variant of Multiprocessing Seems Likely. (Industry Trend Or Event) Copyright 1995, MicroDesign Resources Inc.

* cited by examiner

*Primary Examiner*—Peter Wong
*Assistant Examiner*—Tim Vo
(74) *Attorney, Agent, or Firm*—Anthony V. S. England; Mark E. McBurney

(57) ABSTRACT

A signal is transmitted from a sending chip to a first receiving chip in a communications ring via a first i/o set of the sending chip. A signal from the sending chip to a second receiving chip in the communications ring is transmitted via a second i/o set of the sending chip. The first i/o set corresponds to a first direction for the sending chip transmitting around the ring, and the second i/o set corresponds to a second direction for the sending chip transmitting around the ring. The transmitting via the first i/o set is for a circumstance where a number of chips interposed in the ring between the sending and receiving chips in the first direction is not greater than the number of chips interposed in the second direction. The transmitting via the second i/o set is for a circumstance where the number is greater. For a chip interposed between the sending and receiving chips, the transmitting includes traversing from one of the first and second i/o sets of the at least one interposed chip, to the other one of the first and second i/o sets of the at least one interposed chip. The signal traversing the at least one interposed chip is regenerated by the interposed chip.

16 Claims, 8 Drawing Sheets

COMMUNICATION METHOD FOR INTEGRATED CIRCUIT CHIPS ON A MULTI-CHIP MODULE

CROSS-REFERENCE TO RELATED APPLICATION

This application for patent is related to the following concurrently filed and copending U.S. Patent Applications:

i) Ser. No. 09/364,739, entitled "Integrated Circuit Chip With Features that Facilitate a Multi-Chip Module Having a Number of the Chips"; and ii) Ser. No. 09/364,738, entitled "Multi-chip Module Having Chips Coupled in a Ring," which are hereby incorporated by reference herein.

TECHNICAL FIELD

The present invention relates in general to integrated circuit chips, and in particular, to chips designed for multi-chip systems, especially to aspects of packaging, layout and inter-chip communication aspects of such chips.

BACKGROUND INFORMATION

Operating speeds of integrated circuits, e.g., "IC chips", are ever increasing. Furthermore, according to another trend, chips with extremely dense circuitry and input and output ("i/o") traffic are being implemented on one chip and are being packaged as high-speed, multi-chip systems. High-speed processor chips are an example of this trend. These developments lead to a need to transmit signals between chips at high speeds.

There is a potential to improve communication and operating speeds by locating chips, and especially their i/o leads, close to one another. However, the layout of these very dense chips and their i/o leads is a very complicated matter, making it difficult to design features in their layout which permit such chips to be packaged close to one another.

As a result, there is a need in the art for improvements in chip and package layout, as well as inter-chip communication methods, in order to address the foregoing needs.

SUMMARY OF THE INVENTION

The forgoing needs are met, in at least some respects, in the following methods of communicating among chips coupled in a communication ring on a multi-chip module.

A signal is transmitted from a sending chip to a first receiving chip in the communications ring via a first i/o set of the sending chip. A signal from the sending chip to a second receiving chip in the communications ring is transmitted via a second i/o set of the sending chip. The first i/o set corresponds to a first direction for the sending chip around the ring, and the second i/o set corresponds to a second direction for the sending chip around the ring. The transmitting via the first i/o set is for a circumstance where a number of chips interposed in the ring between the sending and receiving chips in the first direction is not greater than the number of chips interposed in the second direction. The transmitting via the second i/o set is for a circumstance where a number of chips interposed in the ring between the sending and receiving chips in the first direction is greater than a number of interposed chips in the second direction.

For the circumstance where there is at least one interposed chip, the transmitting includes the signal traversing from one of the first and second i/o sets of the at least one interposed chip, to the other one of the first and second i/o sets of the at least one interposed chip.

In one aspect, the transmitting of the signal via the first i/o set includes transmitting the signal via a first i/o subset of the first i/o set for a circumstance where the number of intervening chips in the first direction is less than a certain limit, and via a second i/o subset of the first i/o set for a circumstance where the number of intervening chips in the first direction is not less than the certain limit.

In another aspect, the signal traversing from one of the first and second i/o sets of the at least one interposed chip, to the other one of the first and second i/o sets of the at least one interposed chip includes the signal being regenerated.

In another embodiment, a method is disclosed for communicating among chips coupled in a communication ring on a multi-chip module, where the communication ring has a first and second direction aroiund the ring, and the respective chips have first and second i/o sets corresponding to the respective directions. A signal is transmitted to a receiving chip in the communication ring via the second i/o set of a sending chip in the communications ring, for a circumstance where a number of intervening chips in the first direction is greater than a number of intervening chips in the second direction. Alternatively, the signal is transmitted to the receiving chip via the first i/o set of the sending one of the chips, for the circumstance where the number of intervening chips in the first direction is not greater than the number of intervening chips in the second direction.

In another aspect, for the circumstance where there is at least one interposed chip, the transmitting includes the signal traversing from one of the first and second i/o sets of the at least one interposed chip, to the other one of the first and second i/o sets of the at least one interposed chip.

For the alternative where the transmitting is by the first i/o set, for example, the signal is transmitted via a first i/o subset of the first i/o set for a circumstance where the number of intervening chips in the first direction is less than a certain limit, and via a second i/o subset of the first i/o set for a circumstance where the number of intervening chips in the first direction is not less than the certain limit.

In another aspect, the signal traversing from one of the first and second i/o sets of the at least one interposed chip, to the other one of the first and second i/o sets of the at least one interposed chip includes the signal being regenerated.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
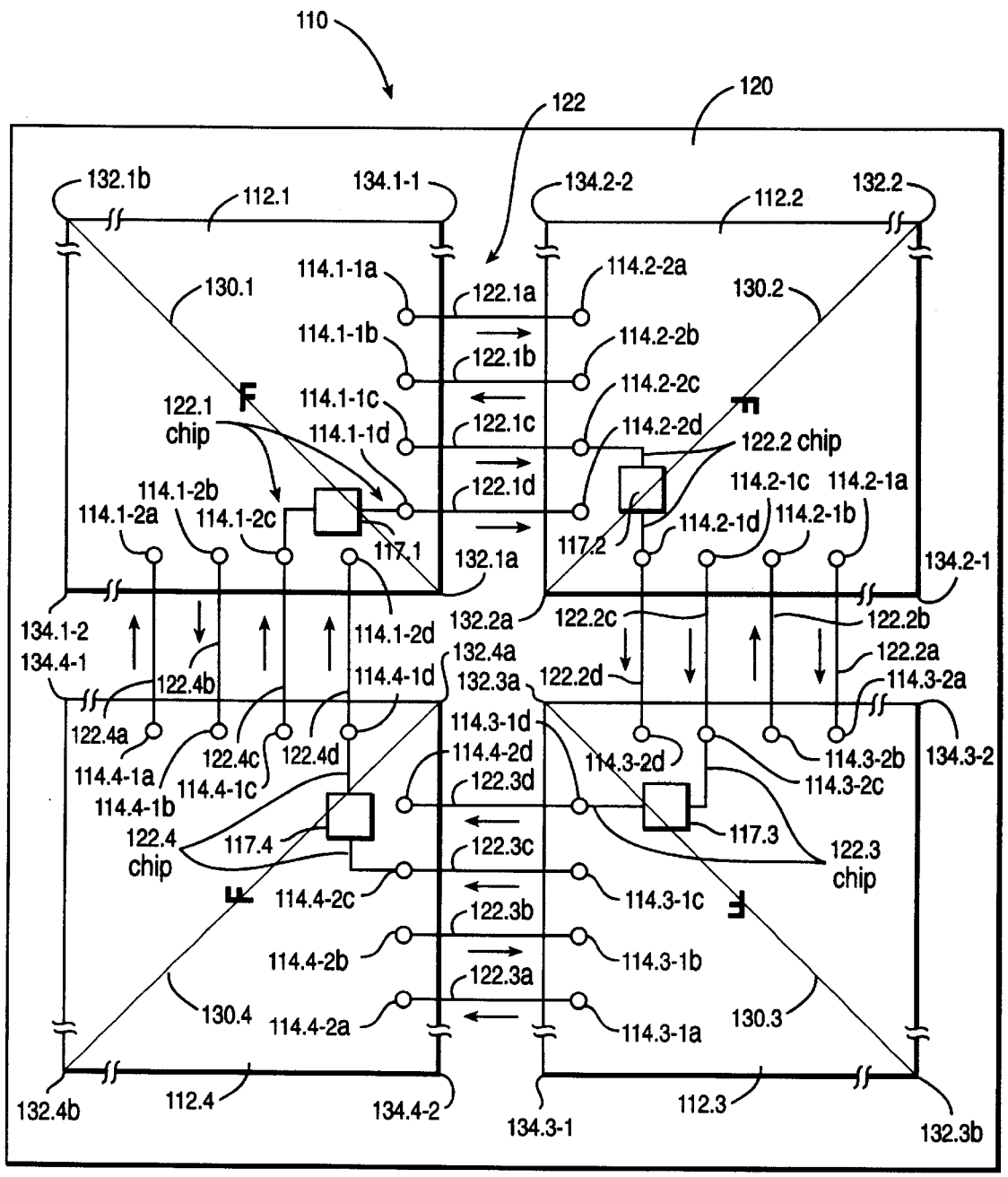
FIG. 1 illustrates an embodiment wherein a multi-chip module has four chips.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Since it is the nature of the invention to have numerous instances of corresponding elements, an element is identified in the drawings and text with a base number having different suffixes for different instances of the element in the drawings. For example, in FIG. 1 multichip module 100 has four, microprocessor chips wired to a dielectric carrier 120. The chips may be referred to collectively as "chips 112", or individually as "chips 112.1, 112.2, 112.3 and 112.4," or "respective chips 112.1, 112.2, 112.3 and 112.4." Chip 112.1 has a first i/o set 114.1-1a, 114.1-1b, 114.1-1c and 114.1-1d, and a second i/o set 114.1-2a, 114.1-2b, 114.1-2c and 114.1-2d, which may be referred to collectively as first set 114.1-1 and second set 114.1-2. Furthermore, since each chip has two such i/o sets, the first sets 114.1-1, 114.2-1, etc. for all the collective chips may be referred to as "i/o set 114-1" and the second sets 114.1-2, 114.2-2, etc. as "i/o set 114-2." It should be understood that although an i/o subset, such as i/o subset 114.11-a may be represented by a "." such as in FIG. 1, for example; nevertheless, the subset actually includes a number of i/o points, such as for an entire bus having data, address and control lines.

Each of the chips 112 shown in FIG. 1 are microprocessors identical in design, but could be of different designs having i/o sets arranged similarly. Preferably, the chips are packaged flip-chip style, and accordingly wired with C4 connections to the carrier 120, but the invention is not limited to this configuration.

In the figure, the orientation of each chip is indicated by the "F" symbol on each chip 112.1 through 112.4. The chips are electrically coupled in a communications ring 122. The communications ring 122 has carrier portions disposed on the carrier 120 and chip portions disposed on the respective chips 112.1, 112.2 etc. For example, a carrier portion is shown at 122.1c and a chip portion at 122.1 chip.

The terminology above, stating that "the communications ring has . . . chip portions disposed on the respective chips" [emphasis added] should be understood to include, for example, the communications ring 122 having a portion, such as chip portion 122.1 chip, traversing at least a portion of one of the chips, e.g., 112.1, either embedded in the chip or on an outside surface of the chip. Likewise for the terminology regarding the carrier.

FIG. 1 particularly shows that the chip ring portions of the ring 122 include respective regeneration circuitry portions 117.1, 117.2, 117.3 and 117.4 interposed on the respective chip portions 112.1 chip, 112.2 chip, 112.3 chip, and 112.4 chip, wherein the respective signals thereon, during their traversals of the respective chips, pass through, i.e. are processed by, regeneration circuitry on the respective chips. Also, FIG. 1 particularly shows that the chips 112 have respective first and second i/o sets 114-1 and 114-2, and that the respective 122.1 chip, 122.2 chip, etc. portions of the ring 122 traverse from respective first i/o sets 114.1-1, 114.2-1, etc. to respective second i/o sets 114.1-2, 114.2-2, etc.

In one aspect, this arrangement permits the carrier ring portions to be substantially straight, whereas chip ring portions turn on the respective chips 112 in traversing from the first i/o set 114-1 to the second set 114-2 (to enable the closure of the ring). This is partcularly beneficial, because fabrication techniques generally permit conductors on a chip to be spaced relatively more close together than conductors on a carrier.

In FIG. 1, the module has four integrated circuit chips 112. Four bus sets are shown, as will now be described. As previously stated, the four chips 112 have respective first i/o sets 114.1-1, 114.2-1, etc. and second i/o sets 114.1-2, 114.2-2, etc. The first i/o set 114.1-1a, 114.1-1b, 114.1-1c and 114.1-1d of the first chip 112.1 is electrically coupled, by a first one of the bus sets 122.1a, 122.1b, 122.1c and 122.1d, to a corresponding i/o set, i.e., the second i/o set 114.2-2a, 114.2-2b, 114.2-2c and 114.2-2c, of the second chip 112.2. The other i/o set 114.2-1a, 114.2-1b, 114.2-1c and 114.2-1d of the second chip 112.2 is electrically coupled, by the second bus set 122.2a, 122.2b, 122.2c and 122.2d to the i/o set 114.3-2a, 114.3-2b, 114.3-2c and 114.3-2d of the third chip 112.3, and so on through the fourth chip 112.4. In addition, the first i/o set 114.1-1a, 114.1-1b, 114.1-1c and 114.1-1d of the fourth chip 112.4 is electrically coupled, by the fourth bus set 122.4a, 122.4b, 122.4c and 122.4d to the second i/o set 114.1-2a, 114.1-2b, 114.1-2c and 114.1-2d of the first chip 112.1, thereby closing the ring 122. Thus, the chips 112 are electrically coupled for communicating in a ring 122.

Furthermore, according to this embodiment as shown in FIG. 1, the corresponding i/o sets 114.1-1 and 114.2-2 of the first and second chips, 112.1 and 112.2 respectively, are in substantial alignment; the corresponding i/o sets 114.2-1 and 114.3-2 of the second and third chips, 112.2 and 112.3 respectively, are in substantial alignment; the corresponding i/o sets 114.3-1 and 114.4-2 of the third and fourth chips, 112.3 and 112.4 respectively, are in substantial alignment; and the corresponding i/o sets 114.4-1 and 114.1-2 of the fourth and first chips, 112.4 and 112.1 respectively, are in substantial alignment.

This alignment of the corresponding i/o sets advatageously faciltates the previously mentioned, substantially straight module portions of the ring. That is carrier buses 122.1, 122.2, 122.3 and 122.4 on the carrier are substantially straight and electrically couple the respective corresponding i/o sets (114.1-1,114.2-2), (114.2-1,114.3-2), (114.3-1,114.4-2) and (114.4-1,114.1-2).

In another aspect of FIG. 1, the chips 112 have their respective first i/o sets 114-1 located symmetrically with respect to their respective second i/o sets 114-2. In still another aspect, the physical symmetry of the i/o sets 114-1 and 114-2 is a relection symmetry.

These two aspects both concern advantageously enabling the placement of a number of chips, each having substantially identical i/o layouts, on a carrier in a manner whereby by merely having a rotated orientation of the chips with respect to one another, the chips may be interconnected by substantially straight conductors on the carrier.

In yet another aspect of FIG. 1, the symmetry, for such first and second i/o sets 114-1 and 114-2 on a chip 112, is a reflection symmetry with respect to a diagonal 130 between two corners 132a and 132b of the chip. Furthermore, according to another aspect, the first i/o sets 114-1 are associated with a first edge 134-1 of their respective chips and the second i/o sets 114-2 are associated with a second edge 134-2 of their respective chips 112. In a still further aspect of FIG. 1, where there are four chips 112, the second edge 134-2 is a side adjacent to the first edge 134-1, and the adjacent first and second edges have a common endpoint at the corner 132a of the chip. This corner is the corner common to the first and second edges, i.e., the common endpoint corner. Also, the four chips are substantially co-planar, wherein within the substantially shared plane in which the chips are substantially co-planar, the second chip 112.2 is rotated 90 degrees relative to the first chip 112.1, the third chip 112.3 is rotated 90 degrees relative to the second chip 112.2, and the fourth chip 112.4 is rotated 90 degrees relative to the third chip 112.3

Note that each chip 112 is connected to two carrier portions of the communication ring. For example, chip 112.1 is connected to carrier ring portions 122.1 and 122.4. Two such carrier ring portions may alternatively be referred to as two carrier bus sets. According to this terminology, each chip is coupled to respective first and second carrier bus sets interconnecting the N chips in a ring. It is noteable that each bus 122.1*a*, 122.1*b*, 122.1*c* and 122.1*d*; 122.2*a*, 122.2*b*, 122.2*c* and 122.2*d*; etc. in the respective carrier bus sets 122.1, 122.2, etc. provides a one-way communications path. The direction of communication is indicated by arrows besides the respective buses. As compared to two-way communication, the one-way communication aspect of the present invention advantageously speeds communication by eliminating dead time on the bus that is required when changing the direction of communication on a two-way communication bus.

Figure 2:
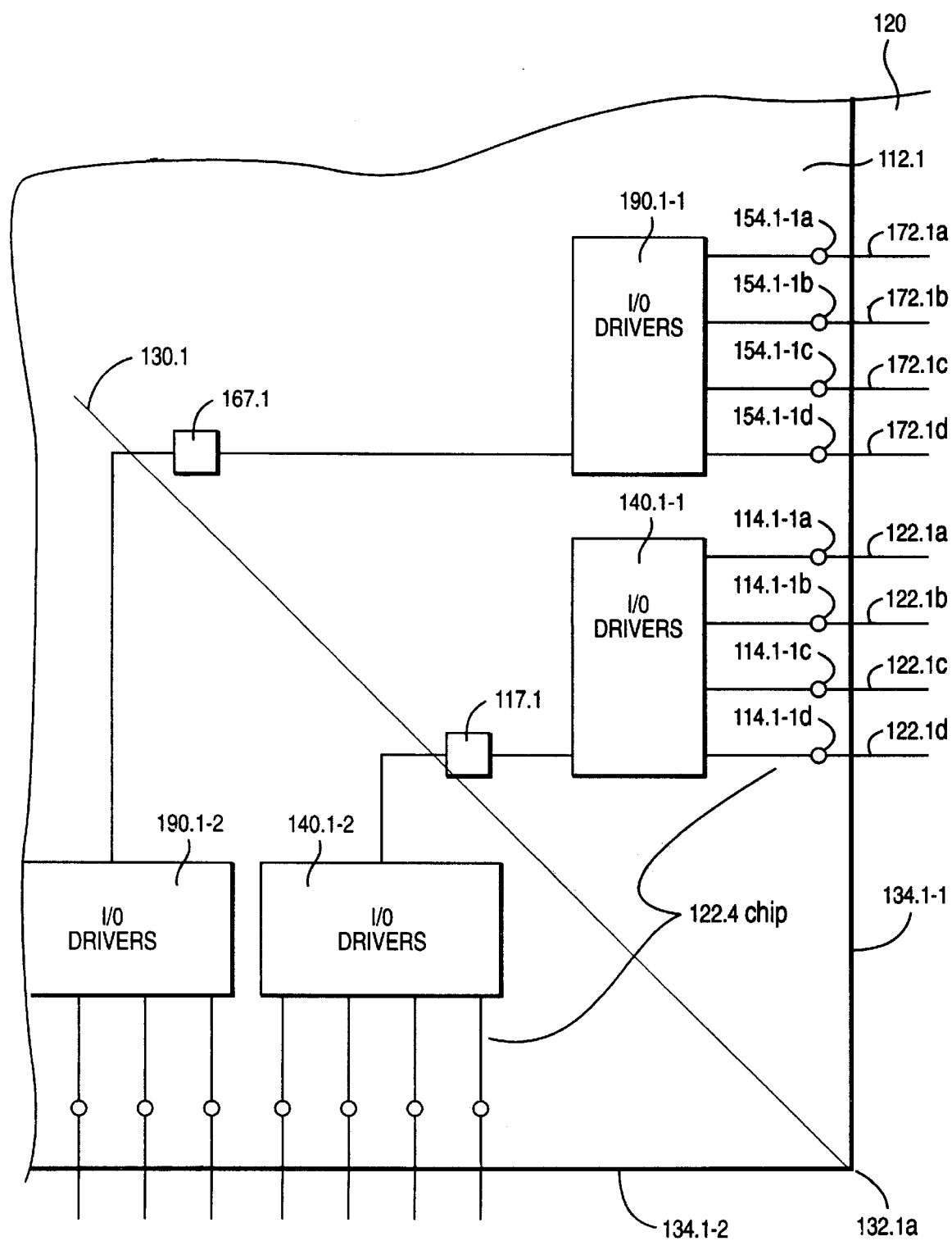
FIG. 2 illustrates further details not shown in FIG. 1.

FIG. 2 illustrates additional details for the multi-chip module of FIG. 1. Chip 112.1 is shown on the module carrier 120. This detail shows that the i/o sets 114.1-1 and 114.1-2 are connected to respective i/o drivers 140.1-1 and 140.1-2 on the chip 112.1. Thus, for chip 112.1 the chip portion 122.1 chip of the communication ring 122 includes the i/o sets 114.1 and 114.1, the i/o drivers 140.1-1 and 140.1-2, the regeneration circuitry 117.1, and the interconnecting wiring shown on the chip 112.1.

The structure illustrated in FIG. 1 lends itself to a method for inter-chip communication, as illustrated in the flow charts of FIGS. 3 through 8. In the following example, chip 112.1 will be a sending chip, and chip 112.3 will be a receiving chip. According to this method, a sending one of the N chips, chip 112.1 in this example, transmits a signal to a receiving one of the N chips, chip 112.3 in this example, from the sending chip's first bus set 122.1 or second bus set 122.2. The clockwise direction corresponds to i/o set 114.1-1 for chip 112.1. The counter-clockwise direction corresponds to i/o set 114.1-2 for chip 112.1. The direction around the ring depends on i) the number of intervening chips between the receiving chip and the sending chip in the first direction around the ring, and ii) the number of intervening chips disposed in the ring between the receiving chip and the sending chip in the second direction around the ring. In the illustrated case, there is one intervening chip, chip 112.2, in the clockwise direction and one intervening chip, again chip 112.2, in the counter-clockwise direction. The transmission is in the clockwise direction, in this example, because in this embodiment each of the chips has only one i/o set connected to a path for a receiving chip having an intervening chip between the sending and receiving chip, and that i/o set is the one for the clockwise direction around the ring 122.

The sending chip, chip 112.1 in this example, transmits the signal to the receiving chip via i/o sub-set 114.1-1*c*, from among the sub-sets 114.1-1*a*, 114.1-1*b* and 114.1-1*c* in the selected i/o set 114.1-1.

The following table, TABLE 1, sets out a pattern of i/o sets, which are coupled to corresponding bus sets, for the embodiment illustrated in FIG. 1.

TABLE 1

| Direction | # intrvng Chips | i/o set | i/o sub-set |
| --- | --- | --- | --- |
| Clockwise | 0 | 1 | a |
| Clockwise | 1 | 1 | c |
| Cntr-clkws | 0 | 2 | b |

According to this embodiment, the one of the i/o sets, and its corresponding bus set, via which the signal is transmitted depends on the number of intervening chips disposed in the ring between the receiving chip and the sending chip in the selected direction around the ring. In the illustrated case, the transmission is via i/o subset 114.1-1*c* because there is one intervening chip, chip 112.2, between the sending chip, chip 112.1, and the receiving chip, 112.3, in the selected direction, clockwise, and according to the predetermined structure the "c" bus connects chips in the clockwise direction which have 1 intervening chip.

The sending chip's i/o driver circuitry 140.1 drives the signal onto the selected bus 122.1*c* toward the receiving chip 112.3.

In another aspect, the signal is transmitted on the bus 122.1*c*, which includes the signal traversing the interposed (aka "intervening") chip 112.2 disposed in the ring between the receiving chip 112.3 and the sending chip 112.1. The signal traversing the intervening chip 112.2 includes the signal being regenerated by the intervening chip's regeneration circuitry 117.2.

In a second example, chip 112.1 is again the sending chip, and chip 112.4 is the receiving chip. According to the method, a sending one of the N chips, again chip 112.1 in this example, transmits a signal to a receiving one of the N chips, chip 112.4 in this second example, from the sending chip's first bus set 122.1 or second bus set 122.2. The direction again depends on i) the number of intervening chips disposed between the receiving chip and the sending chip in a first direction around the ring, and ii) the number of intervening chips disposed in the ring between the receiving chip and the sending chip in a second direction around the ring. In this second example, there are two intervening chips, chip 112.2 and chip 112.3, in the clockwise direction and no intervening chips in the counter-clockwise direction. The transmitting is in the counter-clockwise direction, because there are less intervening chips in that direction.

In the flowcharts of FIGS. 3 through 8, a number of method embodiments are illustrated. Although these flowcharts appear to indicate steps in a sequential fashion, and while the steps may be in the sequence shown, it is not necessary that all the steps be in the sequence indicated, as will be understandable from the context.

Figure 3:
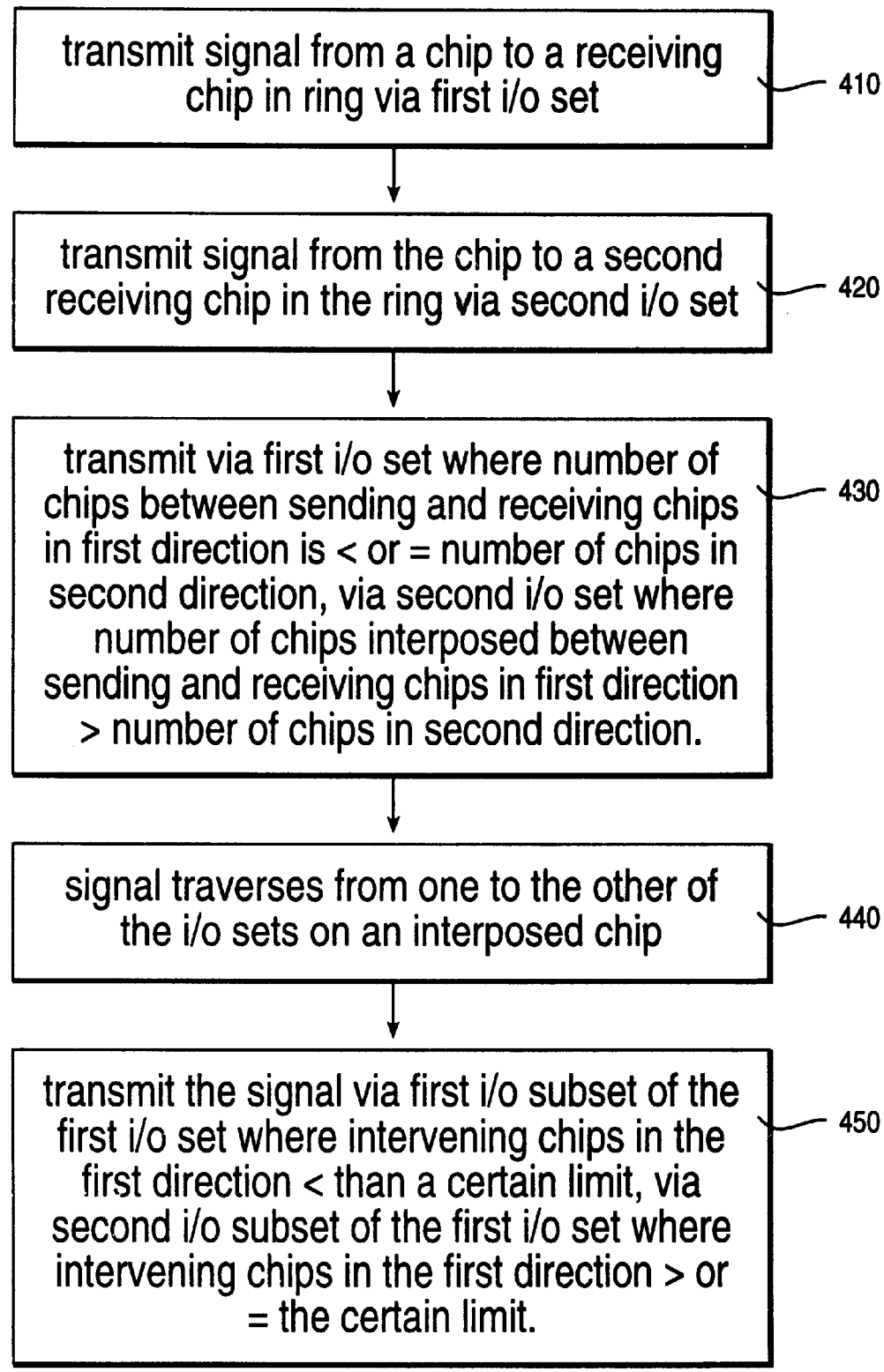
FIGS. 3 through 8 are flow charts for various methods of communicating among chips, such as the chips in the multi-chip module of FIG. 1.

Referring first to FIG. 3, in a first step at 410, a signal is transmitted from a chip, such as chip 112.1, to a receiving chip, such as chip 112.3, in the ring 122 via the sending chip's first i/o set 114-1. At step 420, a signal is also transmitted from the sending chip to a second receiving chip, such as chip 112.4, in the ring via the sending chip's second i/o set 114-2. At step 430, one of the signals, i.e., a signal such as the signal in step 410, is transmit via first i/o set where the number of chips between the sending and receiving chips in the first, clockwise, direction of the first i/o set for the sending chip is not greater than the number of chips in second, counter-clockwise, direction. Also, one such signal, i.e., a signal such as the signal in step 420, is transmitted via the second i/o set, where the number of chips interposed between the sending and receiving chips in the first, i.e. clockwise, direction is greater than the number of chips in the second, counter-clockwise direction. In step 440, one such signal, e.g., a signal such as the signal in step 410, traverses from one to the other of the i/o sets on an interposed chip, i.e., chip 112.2. In step 450, a signal is transmitted via a first i/o subset, i.e. i/o subset 114.1-1*a*, of the first i/o set, where intervening chips in the first direction are less than one, and a signal such as the one in step 420 is transmitted via second i/o subset, i.e., subset 114.1-1*c*, of the first i/o set where intervening chips in the first direction are greater than or equal to 1.

Figure 4:
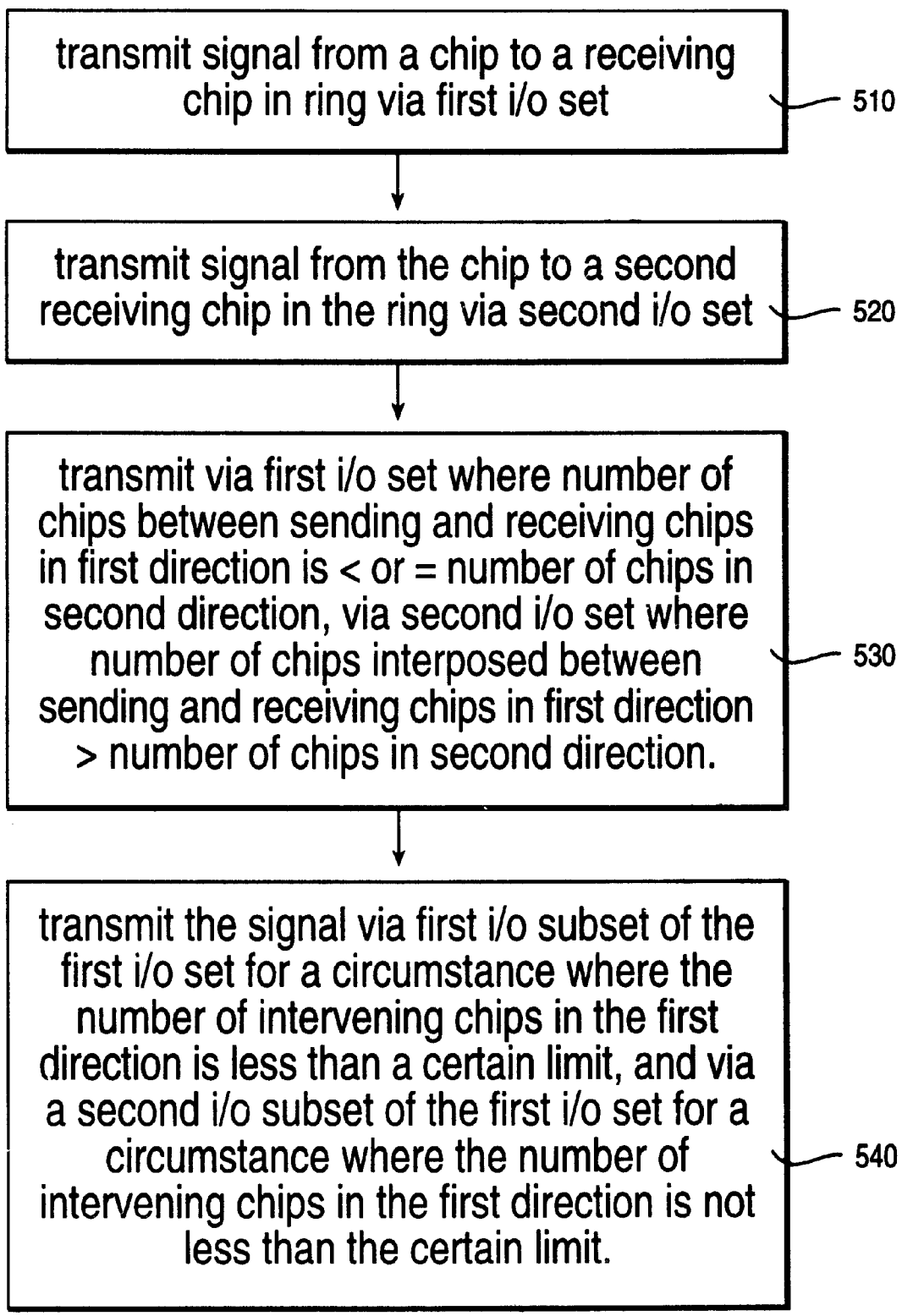

Referring now to FIG. 4, in another embodiment, a signal is transmitted in a first step at 510, a signal is transmitted from a chip, such as chip 112.1, to a receiving chip, such as chip 112.3, in the ring 122 via the sending chip's first i/o set 114-1. At step 520, a signal is also transmitted from the sending chip to a second receiving chip, such as chip 112.4, in the ring via the sending chip's second i/o set 114-2. At step 530, one of the signals, i.e., a signal such as the signal in step 510, is transmit via first i/o set where the number of chips between the sending and receiving chips in the first, clockwise, direction of the first i/o set for the sending chip is not greater than the number of chips in second, counter-clockwise, direction. Also, one such signal, i.e., a signal such as the signal in step 520, is transmitted via the second i/o set, where the number of chips interposed between the sending and receiving chips in the first, i.e. clockwise, direction is greater than the number of chips in the second, counter-clockwise direction. In step 540, a signal is transmitted via a first i/o subset, i.e. i/o subset 114.1-1*a*, of the first i/o set, where intervening chips in the first direction are less than one, and a signal such as the one in step 420 is transmitted via second i/o subset, i.e., subset 114.1-1*c*, of the first i/o set where intervening chips in the first direction are greater than or equal to 1.

Figure 5:
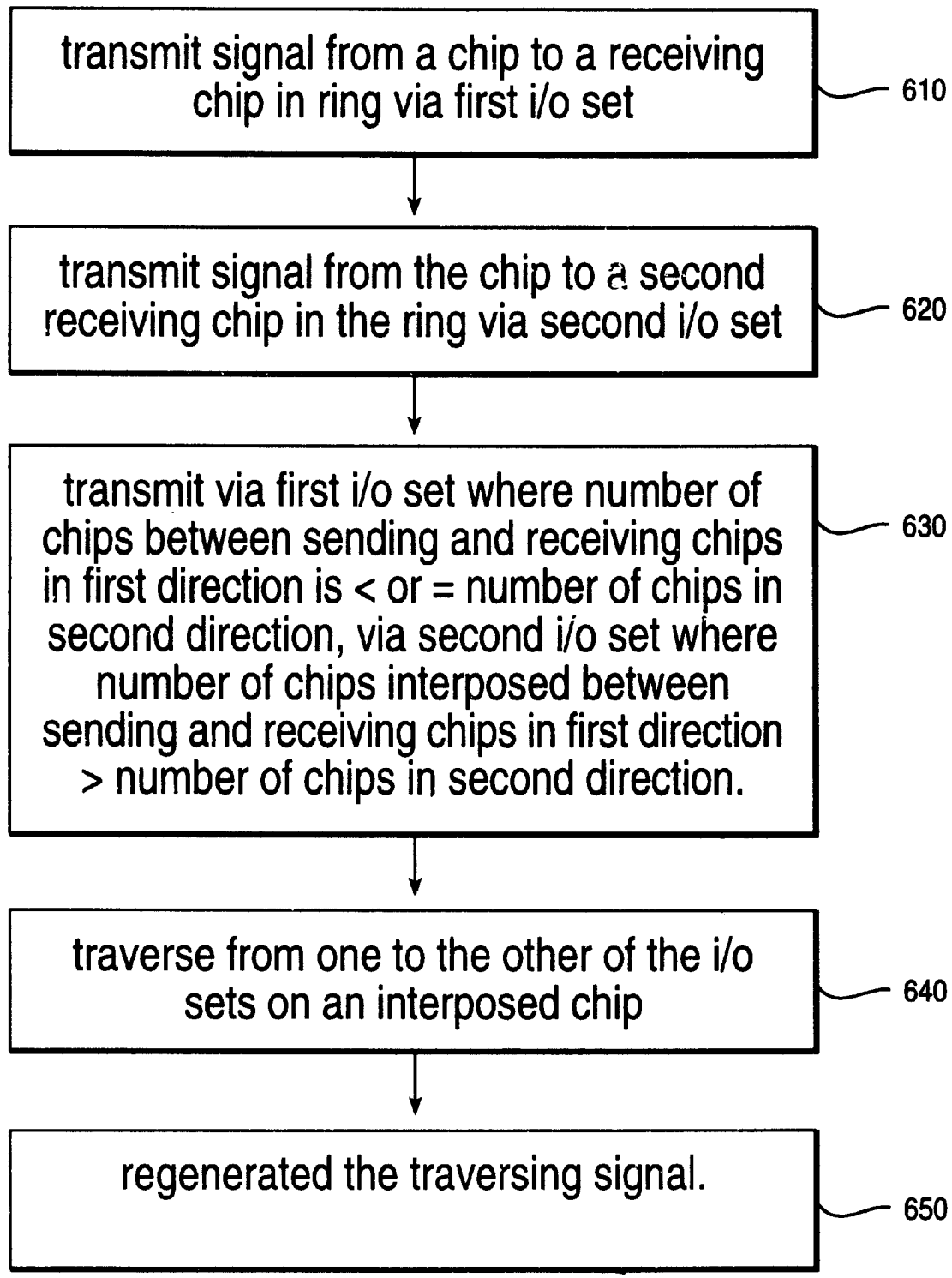

Referring now to FIG. 5, in another embodiment, in a first step at 610, a signal is transmitted from a chip, such as chip 112.1, to a receiving chip, such as chip 112.3, in the ring 122 via the sending chip's first i/o set 114-1. At step 620, a signal is also transmitted from the sending chip to a second receiving chip, such as chip 112.4, in the ring via the sending chip's second i/o set 114-2. At step 630, one of the signals, i.e., a signal such as the signal in step 610, is transmit via first i/o set where the number of chips between the sending and receiving chips in the first, clockwise, direction of the first i/o set for the sending chip is not greater than the number of chips in second, counter-clockwise, direction. Also, one such signal, i.e., a signal such as the signal in step 620, is transmitted via the second i/o set, where the number of chips interposed between the sending and receiving chips in the first, i.e. clockwise, direction is greater than the number of chips in the second, counter-clockwise direction. In step 640, one such signal, e.g., a signal such as the signal in step 410, traverses from one to the other of the i/o sets on an interposed chip, i.e., chip 112.2. In step 650 the traversing signal is regenerated on the interposing chip.

Figure 6:
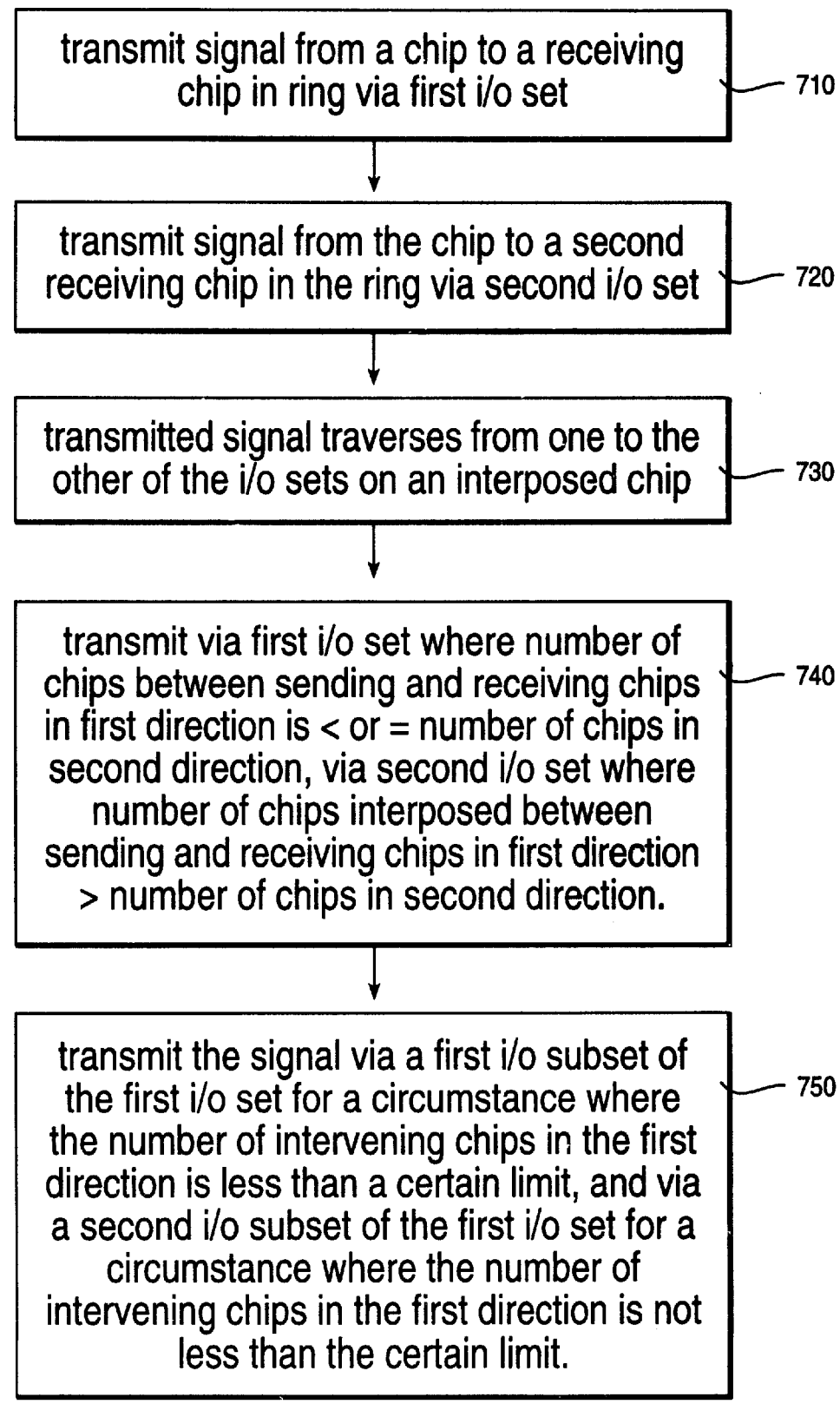

Referring now to FIG. 6, in another embodiment, in a first step at 710, a signal is transmitted from a chip, such as chip 112.1, to a receiving chip, such as chip 112.3, in the ring 122 via the sending chip's first i/o set 114-1. At step 720, a signal is also transmitted from the sending chip to a second receiving chip, such as chip 112.4, in the ring via the sending chip's second i/o set 114-2. In step 730, one such signal, e.g., a signal such as the signal in step 410, traverses from one to the other of the i/o sets on an interposed chip, i.e., chip 112.2. At step 740, one of the signals, i.e., a signal such as the signal in step 710, is transmitted via first i/o set where the number of chips between the sending and receiving chips in the first, clockwise, direction of the first i/o set for the sending chip is not greater than the number of chips in second, counter-clockwise, direction. Also, one such signal, i.e., a signal such as the signal in step 720, is transmitted via the second i/o set, where the number of chips interposed between the sending and receiving chips in the first, i.e. clockwise, direction is greater than the number of chips in the second, counter-clockwise direction. In step 750, a signal is transmitted via a first i/o subset, i.e. i/o subset 114.1-1*a*, of the first i/o set, where intervening chips in the first direction are less than one, and a signal such as the one in step 720 is transmitted via second i/o subset, i.e., subset 114.1-1*c*, of the first i/o set where intervening chips in the first direction are greater than or equal to 1.

Figure 7:
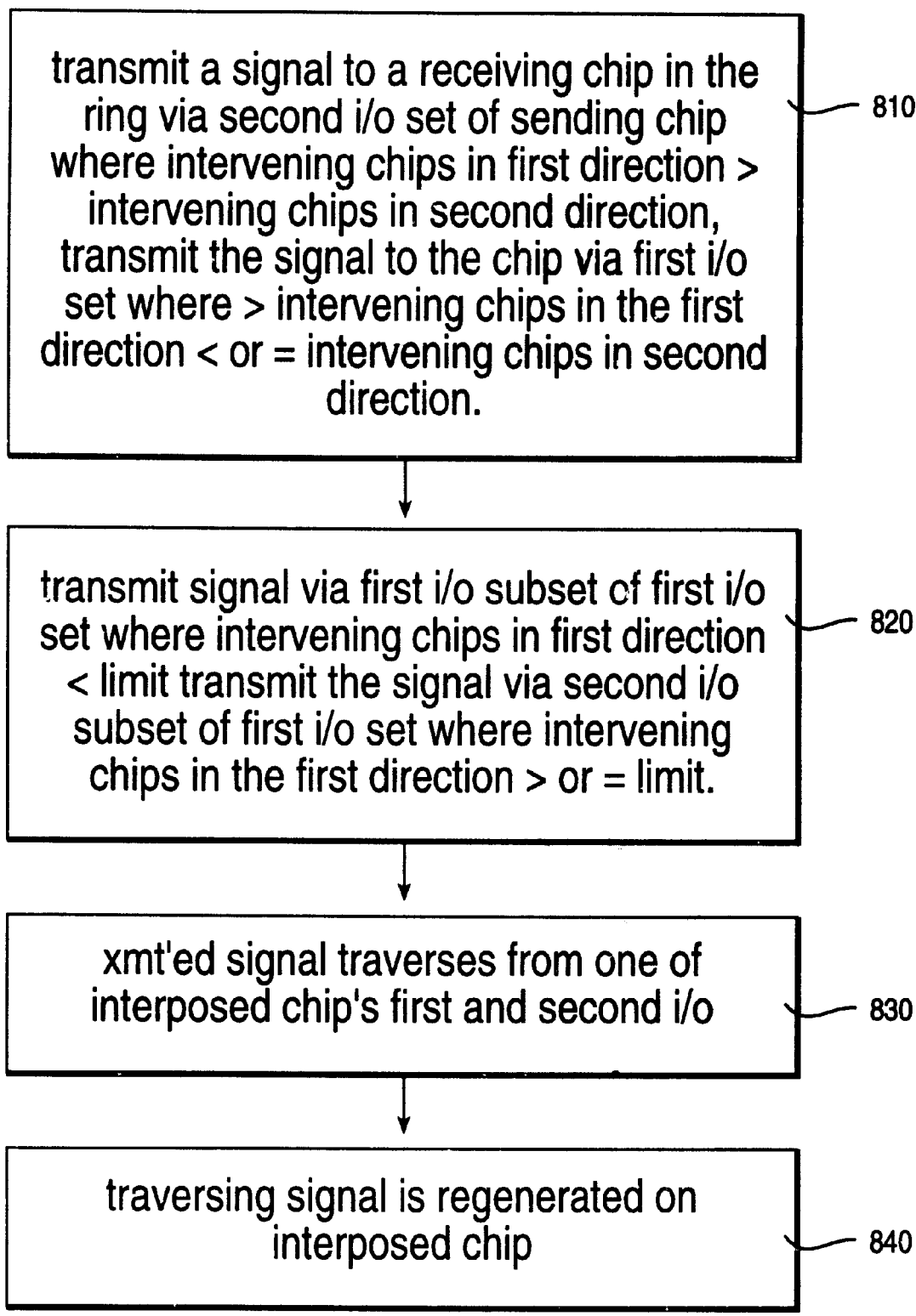

Referring now to FIG. 7, in another embodiment, according to step 810 a signal is transmitted to a receiving chip in the ring via second i/o set of the sending chip where intervening chips in the first direction are greater in number than in the second direction. Alternatively, the signal is transmitted to the receiving chip via the first i/o set of the sending chip, where the number of intervening chips in the first direction is not greater than in the second direction. In step 820, one such signal, e.g., a signal such as a signal in step 810 transmitted via the first i/o set, traverses from one to the other of the i/o sets on an interposed chip, i.e., chip 112.2. In step 830, such a signal is transmitted via a first i/o subset, i.e. i/o subset 114.1-1*a*, of the first i/o set, where intervening chips in the first direction are less than one, and a signal such as the one in step 810 is transmitted via second i/o subset, i.e., subset 114.1-1*c*, of the first i/o set where intervening chips in the first direction are greater than or equal to one. In step 840, the traversing signal is regenerated on the interposed chip.

Figure 8:
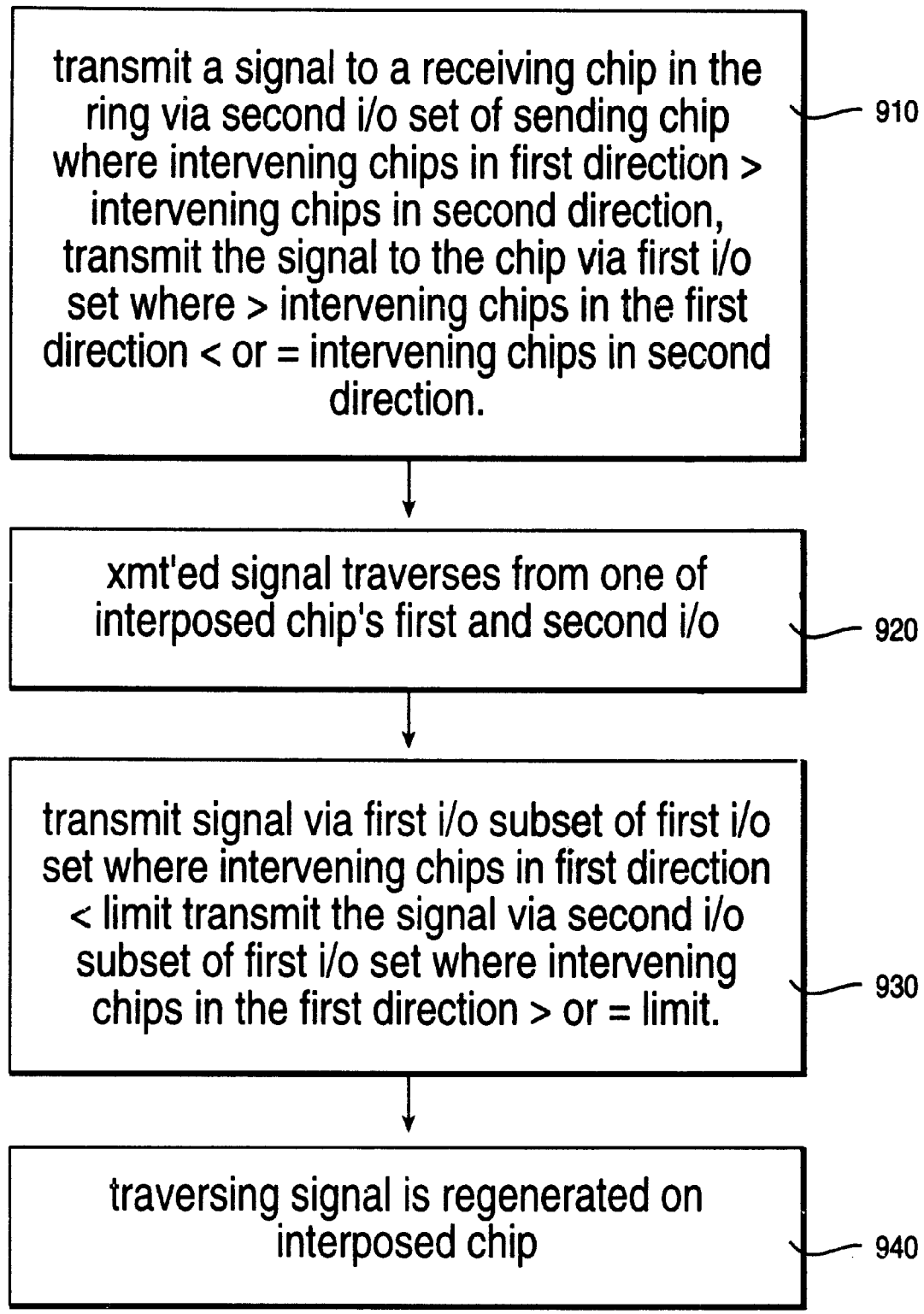

Referring now to FIG. 8, in another embodiment, according to step 910 a signal is transmitted to a receiving chip in the ring via second i/o set of the sending chip where intervening chips in the first direction are greater in number than in the second direction. Alternatively, the signal is transmitted to the receiving chip via the first i/o set of the sending chip, where the number of intervening chips in the first direction is not greater than in the second direction. In step 820, such a signal is transmitted via a first i/o subset, i.e. i/o subset 114.1-1*a*, of the first i/o set, where intervening chips in the first direction are less than one, and a signal such as the one in step 810 is transmitted via second i/o subset, i.e., subset 114.1-1*c*, of the first i/o set where intervening chips in the first direction are greater than or equal to one. In step 830, one such signal, e.g., a signal such as a signal in step 810 transmitted via the first i/o set, traverses from one to the other of the i/o sets on an interposed chip, i.e., chip 112.2. In step 840, the traversing signal is regenerated on the interposed chip.

Although the present invention and its advantages have been described in detail, it should be understood that various changes, substitutions and alterations can be made herein without departing from the spirit and scope of the invention as defined by the appended claims.

What is claimed is:

1. A method of communicating among chips coupled in a communication ring on a multi-chip module, comprising the steps of:

transmitting a signal from a sending one of the chips to a first receiving one of the chips in the communications ring via a first i/o set of the sending chip; and transmitting a signal from the sending chip to a second receiving one of the chips in the communications ring via a second i/o set of the sending chip, wherein the first i/o set corresponds to a first direction for the sending chip around the ring and the second i/o set corresponds to a second direction for the sending chip around the ring, and the transmitting via the first i/o set is for a circumstance where a number of chips interposed in the ring between the sending and receiving chips in the first direction is not greater than the number of chips interposed in the second direction, and the transmitting via the second i/o set is for a circumstance where a number of chips interposed in the ring between the sending and receiving chips in the first direction is greater than a number of interposed chips in the second direction.

2. The method of claim 1, wherein for the circumstance where there is at least one interposed chip, the transmitting includes the signal traversing from one of the first and second i/o sets of the at least one interposed chip, to the other one of the first and second i/o sets of the at least one interposed chip.

3. The method of claim 1, wherein the transmitting of the signal via the first i/o set comprises the steps of:
transmitting the signal via a first i/o subset of the first i/o set for a circumstance where the number of intervening chips in the first direction is less than a certain limit; and
transmitting the signal via a second i/o subset of the first i/o set for a circumstance where the number of intervening chips in the first direction is not less than the certain limit.

4. The method of claim 2, wherein the transmitting of the signal via the first i/o set comprises the steps of:
transmitting the signal via a first i/o subset of the first i/o set for a circumstance where the number of intervening chips in the first direction is less than a certain limit; and
transmitting the signal via a second i/o subset of the first i/o set for a circumstance where the number of intervening chips in the first direction is not less than the certain limit.

5. The method of claim 2, wherein the signal traversing from one of the first and second i/o sets of the at least one interposed chip, to the other one of the first and second i/o sets of the at least one interposed chip includes the signal being regenerated.

6. A method of communicating among chips coupled in a communication ring on a multi-chip module, comprising the steps of:
transmitting a signal from a sending one of the chips to a first receiving one of the chips in the communications ring via a first i/o set of the sending chip; and
transmitting a signal from the sending chip to a second receiving one of the chips in the communications ring via a second i/o set of the sending chip, wherein for the circumstance where there is at least one chip interposed between the sending and receiving chip, the transmitting includes the signal traversing from one of the first and second i/o sets of the at least one interposed chip, to the other one of the first and second i/o sets of the at least one interposed chip, wherein the first i/o set corresponds to a first direction for the sending chip around the ring and the second i/o set corresponds to a second direction for the sending chip around the ring, and the transmitting via the first i/o set is for a circumstance where a number of chips interposed in the ring between the sending and receiving chips in the first direction is not greater than the number of chips interposed in the second direction, and the transmitting via the second i/o set is for a circumstance where a number of chips interposed in the ring between the sending and receiving chips in the first direction is greater than a number of interposed chips in the second direction.

7. The method of claim 6, wherein the transmitting of the signal via the first i/o set comprises the steps of:
transmitting the signal via a first i/o subset of the first i/o set for a circumstance where the number of intervening chips in the first direction is less than a certain limit; and
transmitting the signal via a second i/o subset of the first i/o set for a circumstance where the number of intervening chips in the first direction is not less than the certain limit.

8. The method of claim 7, wherein the signal traversing from one of the first and second i/o sets of the at least one interposed chip, to the other one of the first and second i/o sets of the at least one interposed chip includes the signal being regenerated.

9. A method of communicating among chips coupled in a communication ring on a multi-chip module, wherein the communication ring has a first and second direction aroiund the ring, and the respective chips have first and second i/o sets corresponding to the respective directions, the method comprising the steps of:
a) transmitting a signal to a receiving one of the chips in the communication ring via the second i/o set of a sending one of the chips in the communications ring for a circumstance where a number of intervening chips in the first direction is greater than a number of intervening chips in the second direction; and
b) transmitting the signal to the receiving one of the chips via the first i/o set of the sending one of the chips for the circumstance where the number of intervening chips in the first direction is not greater than the number of intervening chips in the second direction.

10. The method of claim 9, wherein for the circumstance where there is at least one interposed chip, the transmitting includes the signal traversing from one of the first and second i/o sets of the at least one interposed chip, to the other one of the first and second i/o sets of the at least one interposed chip.

11. The method of claim 9, wherein step b) comprises the steps of:
transmitting the signal via a first i/o subset of the first i/o set for a circumstance where the number of intervening chips in the first direction is less than a certain limit; and
transmitting the signal via a second i/o subset of the first i/o set for a circumstance where the number of intervening chips in the first direction is not less than the certain limit.

12. The method of claim 10, wherein step b) comprises the steps of:
transmitting the signal via a first i/o subset of the first i/o set for a circumstance where the number of intervening chips in the first direction is less than a certain limit; and
transmitting the signal via a second i/o subset of the first i/o set for a circumstance where the number of intervening chips in the first direction is not less than the certain limit.

13. The method of claim 11, wherein for the circumstance where there is at least one interposed chip, the transmitting includes the signal traversing from one of the first and second i/o sets of the at least one interposed chip, to the other one of the first and second i/o sets of the at least one interposed chip.

14. The method of claim 12, wherein the signal traversing from one of the first and second i/o sets of the at least one interposed chip, to the other one of the first and second i/o sets of the at least one interposed chip includes the signal being regenerated.

15. The method of claim 13, wherein the signal traversing from one of the first and second i/o sets of the at least one interposed chip, to the other one of the first and second i/o sets of the at least one interposed chip includes the signal being regenerated.

16. A method of communicating among chips coupled in a communication ring on a multi-chip module, comprising the steps of:

transmitting a signal from a sending one of the chips to a first receiving one of the chips in the communications ring via a first i/o set of the sending chip; and transmitting a signal from the sending chip to a second receiving one of the chips in the communications ring via a second i/o set of the sending chip, wherein the first i/o set corresponds to a first direction for the sending chip around the ring and the second i/o set corresponds to a second direction for the sending chip around the ring, and wherein the transmitting of the signal via the first i/o set comprises the steps of:

transmitting the signal via a first i/o subset of the first i/o set for a circumstance where a number of intervening chips in the first direction is less than a certain limit; and transmitting the signal via a second i/o subset of the first i/o set for a circumstance where the number of intervening chips in the first direction is not less than the certain limit.

* * * * *